United States Patent [15] 3,692,759
Ocone [45] Sept. 19, 1972

[54] EXTRUDABLE POLYTETRAFLUOROETHYLENE POWDER

[72] Inventor: Luke Ralph Ocone, Wyndmoor, Pa.

[73] Assignee: Pennwalt Corporation, Philadelphia, Pa.

[22] Filed: Feb. 23, 1971

[21] Appl. No.: 118,158

[52] U.S. Cl. ............... 260/92.1, 260/29.6, 260/33.6, 260/87.5, 260/87.7, 264/127, 264/211
[51] Int. Cl. ........................... C08f 3/24, C08f 15/06
[58] Field of Search ...................... 260/92.1 S, 92.1 R

[56] References Cited

UNITED STATES PATENTS 3,464,964  9/1969  Black .................... 260/92.1 S

Primary Examiner—Harry Wong, Jr.
Attorney—Stanley Litz and Carl A. Hechmer, Jr.

[57] ABSTRACT

Polytetrafluoroethylene resin powder having improved paste extrusion properties is prepared by freeze drying aqueous PTFE latex solids.

3 Claims, No Drawings

EXTRUDABLE POLYTETRAFLUOROETHYLENE POWDER

This invention concerns a process for preparing a powdery polytetrafluoroethylene resin having improved paste extrusion properties and the resin so produced. More particularly, this invention pertains to a process for obtaining polytetrafluoroethylene resin powder having improved paste extrusion characteristics by subjecting aqueous polytetrafluoroethylene latex resin solids to freeze drying to separate the water from the resin by sublimation.

It is well known to prepare a latex (i.e., a colloidal dispersion) of tetrafluoroethylene polymer by the emulsion polymerization of the monomer in aqueous medium containing emulsifying agent (surfactant), initiated by a free-radical catalyst, and in admixture with various other modifying ingredients if so desired. Typical procedures for preparing aqueous dispersions of polytetrafluoroethylene are set forth, for example, in U.S. Pat. Nos. 2,559,752; 2,750,350; 3,088,941; and 3,345,317. (The terms "polytetrafluoroethylene," "PTFE," "tetrafluoroethylene polymer" and "polytetrafluoroethylene resin" used herein mean both the normally solid high molecular weight tetrafluoroethylene homopolymers and the normally solid high molecular weight copolymers thereof containing a predominance of tetrafluoroethylene units, for example, copolymers of tetrafluoroethylene with up to about 5 mole percent of comonomers such as vinylidene fluoride, hexafluoropropene, 1-chloro-1-fluoroethylene, trifluorochloroethylene, trifluoroethylene, ethylene, propylene, isobutylene, and others, such copolymers having physical properties essentially the same as the homopolymer with regard to fabrication techniques, e.g., extrusion). The aqueous polytetrafluoroethylene latexes so prepared are dispersions of polytetrafluoroethylene resin having a particle size distribution within the range of about 0.1 micron to about 0.5 micron, the polymer solids comprising from about 5 to about 60 weight percent of the composition.

In conventional procedures the colloidally dispersed polytetrafluoroethylene is recovered from the aqueous medium by inducing coagulation of the latex, separating the coagula from the aqueous medium by decantation or filtration, or both, and drying the coagula to yield the polytetrafluoroethylene powder, such as by air drying, or usually by air-oven drying at temperatures within the range of about 20°C. to about 150°C.

It is well known that polytetrafluoroethylene is difficult to fabricate into various shapes by techniques applicable to most plastics. Although polytetrafluoroethylene resin has a crystalline melting point of about 327°C., its melt viscosity is too high to permit fabrication by the conventional methods of melt processing such as extrusion and injection molding. Consequently, special extrusion techniques have been developed for polytetrafluoroethylene in which the powder is preformed into the desired shape, which subsequently is sintered to cause coalescence of the particles. One of these special techniques, known as "paste extrusion" and described in detail in U.S. Pat. Nos. 2,685,707 and 3,389,201, involves combining the polytetrafluoroethylene powder with from about 12 to 22 weight percent of liquid lubricant (suitable lubricants, preferably hydrocarbons, are set forth in detail in said U.S. Pat. No. 2,685,707); the lubricated polymer is then passed under pressure through a die having the size and shape of the desired article under conditions such that the lubricant is not volatilized. The resulting "paste - extrudate" (preform) is dried (to volatize the lubricant) and the preform is then heated at a temperature above about 350°C. to sinter the polymer.

A variety of methods have been employed to coagulate the polytetrafluoroethylene latex to yield the resin which is separated and dried to powder and used for paste-extrusion, for example, high- and low- shear mechanical agitation of the latex, freezing the latex, addition of electrolytes or solvents to the latex, and aeration of the latex with an inert gas (U.S. Pat. No. 3,464,964). It has been observed that the method of coagulation may have an effect on the extrusion characteristics of the resin and special techniques of shear coagulation have been devised (U.S. Pat. Nos. 2,593,583 and 3,046,263) to influence these properties. The various methods of coagulation yield polytetrafluoroethylene resins, which, when dried by the conventional methods discussed earlier (e.g., warm air) require different extrusion pressures. In addition, the qualities of the extrudates vary depending on the coagulation method. However, all such conventional drying methods yield resins which require relatively high paste-extrusion pressures.

It has now been discovered, in accordance with the present invention, that polytetrafluoroethylene resin that has been recovered by freeze drying the latex solids can be paste extruded at comparatively much lower pressures (as confirmed by the examples set forth hereinbelow), and that the quality of the extrudates is generally superior to that of extrudates made from air-dried polymer, as measured by smoother surface, greater perform toughness and absence of extrusion fracture. In addition, the present invention enables the extrusion of thinner sectioned shapes at high reduction ratios and low extrusion pressures. (The reduction ratio of the extrusion is the ratio of the area of the barrel of the extruder to the area of the orifice through which the paste is extruded).

In the embodiments of this invention, good results are obtained by either freeze drying the total aqueous polymer latex, that is, without prior coagulation and separation, or by freeze-drying the wet coagula obtained by latex coagulation as above-described, followed by decantation of the aqueous layer, or separation by filtration, or both. The freeze drying of the resin solids is carried out so as to yield a polymer powder containing no more than about 0.1 weight percent moisture.

Thus, the freeze drying operation embodied herein may be performed on the total (uncoagulated) polytetrafluoroethylene latex or, in the preferred embodiment, on the wet coagula of said latex. In accordance with conventional and preferred freeze drying techniques, the aforesaid polymer-water mixture is frozen (e.g., to from about −196°C. to 0°C.) and then subjected to heat under suitable vacuum to effect separation of the water from the resin by sublimation. Reduced pressures on the order of $10^{-6}$ to 4 mm. Hg abs. may be employed; generally, the higher vacuums are preferred, i.e., pressures in the range of $10^{-6}$ to 0.5 mm. Hg. abs. The transition from solid water to gaseous water (sublimation) is endothermic, and energy must be supplied to effect the transition. As long as the chamber is maintained at a pressure lower than the vapor pressure of the frozen water, sublimation will cool the sample and prevent melting of the ice. Vacuum freeze drying equipment suitably adapted for use herein is commercially available for either batch on continuous operations. As an alternative to reduced pressure operations, the freeze drying may be accomplished by sublimation of the water in the presence of an inert gas, i.e., by passage of a cold dry gas such as nitrogen, oxygen, air, helium, etc. over the coagulum to remove water vapor in equilibrium with the ice, thereby removing the ice from the resin by sublimation.

The superior paste extrusion performance of the polymers processed in accordance with this invention is confirmed by the following examples. Freeze drying operations were carried out in the Stokes Model 6P Freeze Dryer (Product of Stokes Division, Pennwalt Corporation) in which the PTFE latex or coagula was charged into trays in contact with the cooled ($-20°C.$) shelves of the freeze dryer. After the charge was completely frozen, the drying chamber was evacuated by a mechanical vacuum pump, and the shelves were warmed to sublime the ice and dry the polymer. Air drying operations were carried out by allowing the water to evaporate from the latex or coagula at 20°–30 °C. All of the dried resins contained less than 0.1 percent moisture. Paste extrusion evaluations of the resins were made by mixing 18 percent by weight of lubricant ("Soltrol 130," a petroleum derived hydrocarbon, product of Phillips Petroleum Company) with the dried PTFE and extruding the mixture at 20°C. through a die having a reduction ratio (R) of 1,050, where $R = (D_b/D_a)^2$ and $D_b$ = diameter of extrusion cylinder and $D_a$ = diameter of the orifice (G. R. Snelling and J.F. Lontz, *Journal of Applied Polymer Science*, vol. III, 9, pp. 259–265 (1960). Unless otherwise indicated the extrusion rate was 13 grams resin per minute, exclusive of lubricant.

EXAMPLE 1

A sample of an aqueous latex containing 30 percent dispersed polytetrafluoroethylene resin (particle size 0.1 to 0.3 micron) is air-dried as above-described. A pressure of over 15,000 psi is required to paste extrude the resin into filament. Another sample of the same latex is freeze-dried as above-described, and when paste extruded under the same conditions, only 8,200 psi extruder pressure is required.

EXAMPLE 2

The comparison of the previous example is repeated starting with an aqueous latex containing 46 percent polytetrafluoroethylene(particle size 0.1 to 0.3 micron). An extruder pressure of 14,700 psi is needed to process the air-dried resin compared to 10,000 psi for the freeze-dried material.

EXAMPLE 3

A latex as described in Example 1 containing 30 percent polymer is coagulated by freezing and a portion of the polytetrafluoroethylene coagula is air-dried. The remaining coagula is freeze-dried. The air-dried resin requires an extruder pressure of over 15,000 psi compared to 8,200 psi for the freeze-dried product.

EXAMPLE 4

An aqueous polytetrafluoroethylene latex as described in Example 3 is coagulated by low shear agitation. A portion of the coagula is air-dried at 100°C. The other portion is freeze-dried. A pressure of 12,500 psi is needed to obtain an extrusion rate of 10 grams/minute of the air-dried polymer whereas only 8,000 psi is required to achieve that rate for the freeze-dried polymer under otherwise identical extrusion conditions.

In all of the preceding examples it is noted that the quality of paste-extrudates prepared from freeze-dried polymer is superior to that of the paste-extrudates from air-dried polymer. More specifically, the former filaments are smoother and straighter and exhibit minimal extrusion fracture defects.

I claim:

1. A process for preparing polytetrafluoroethylene powder having improved paste extrusion properties which comprises freeze drying aqueous polytetrafluoroethylene latex resin solids to separate the water from the resin.

2. A process according to claim 1 wherein the freeze drying is performed on the wet coagula of said latex.

3. A process according to claim 1 wherein the freeze drying is performed on uncoagulated latex.

* * * * *